(12) United States Patent
Morita

(10) Patent No.: US 6,249,744 B1
(45) Date of Patent: Jun. 19, 2001

(54) MOTORCYCLE WITH NAVIGATION SYSTEM CARRIED THEREON

(75) Inventor: Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,845

(22) Filed: Sep. 6, 2000

(30) Foreign Application Priority Data

Sep. 6, 1999 (JP) .................................................. 11-252347
Sep. 6, 1999 (JP) .................................................. 11-252348

(51) Int. Cl.[7] .................................................. G06F 165/00
(52) U.S. Cl. ........................... 701/213; 701/200; 701/207; 701/208; 345/905; 340/988; 340/990; 342/357.01; 342/357.06
(58) Field of Search ............................. 701/28, 200, 207, 701/208, 211, 212, 213, 214; 345/357.01, 357.06, 357.08, 1, 4, 5, 905; 340/988, 990, 995

(56) References Cited

U.S. PATENT DOCUMENTS

| 5,173,686 | * | 12/1992 | Fujihara | 340/700 |
| 5,467,106 | * | 11/1995 | Salomon | 345/87 |
| 5,831,817 | * | 11/1998 | Chang | 361/681 |
| 6,023,414 | * | 2/2000 | Fujii | 361/761 |
| 6,037,954 | * | 3/2000 | McMahon | 345/901 |
| 6,125,030 | * | 9/2000 | Mola et al. | 361/681 |
| 6,144,552 | * | 11/2000 | Whitcher et al. | 361/681 |

FOREIGN PATENT DOCUMENTS 995276  4/1997  (JP) .

* cited by examiner

Primary Examiner—William A. Cuchlinski, Jr.
Assistant Examiner—Gertrude Arthur
(74) Attorney, Agent, or Firm—Birch, Stewart, Kolasch & Birch, LLP (57) ABSTRACT

To make it possible to adopt a navigation system simply and readily in a scooter and to retract a display unit of a navigation system mounted on the scooter when not in use. A box is provided along a lower edge of an instrument panel of a scooter, and a PDA is removably accommodated in the box. The PDA has a memory for storing electronic map information, route information and so forth and a display panel, and provides navigation information based on measurement position data from a GPS sensor. A window which fits with the display panel of the PDA accommodated in the box and a switch are provided on the box. The box can be pivoted from a use position set such that a face of the display panel of the PDA accommodated in the inside of the box 100 extends along a face of the instrument panel to a retracted position.

18 Claims, 10 Drawing Sheets

| DOP VALUE | 100 |
| --- | --- |
| VELOCITY | 36 KM/H |
| ALTITUDE | NORTH ALTITUDE 35°48'16.5" |
| LATITUDE | EAST LATITUDE 139°34'53.1" |
| DIRECTION | 216° |

MOTORCYCLE WITH NAVIGATION SYSTEM CARRIED THEREON

BACKGROUND OF THE INVENTION

1. Field of the Invention

The present invention relates to a motorcycle with a navigation system carried thereon. In particular the present invention relates to a motorcycle on which a navigation system which makes use of a personal digital assistance (hereinafter referred to as "PDA") is carried.

2. Description of Background Art

The use of navigation systems is known, wherein map information and a position detection apparatus (GPS) which makes use of satellite radio waves are combined to display the present location of a vehicle on a map so as to guide the vehicle to a destination. Conventionally, a navigation system for a vehicle has been used principally in four-wheeled cars. In recent years, however, also it has been investigated to carry a navigational system on a motorcycle. For example, in the official gazette of Japanese Patent Laid-Open No. Hei 6-95276, a motorcycle having a navigation system carried thereon is proposed wherein the mounted position of a direction sensor is taken into consideration so that satellite radio waves may be received readily. Furthermore, in the navigation system disclosed in the official gazette mentioned, a sun visor and an openable and closeable cover are provided on a display unit.

The conventional navigation system still has the following problems where it is attempted to incorporate it suitably in a motorcycle. First, since a motorcycle is generally smaller in size than a four-wheeled car, the space in which a navigation system is carried is limited severely. Second, on a motorcycle, a navigation system is carried in a state wherein it is exposed to the elements.

In particular, the conventional navigation system is too large when used as a system for use with a motorcycle. In addition, no sufficient attention is paid to the position or the manner at or in which the system is carried. Accordingly, further improvement regarding ease of observation of a display screen of the system, protection from dust and water, etc. is demanded.

SUMMARY AND OBJECTS OF THE INVENTION

It is an object of the present invention to provide a motorcycle on which a navigation system which solves the above-described deficiencies and is improved in utility is carried.

In order to achieve the object described above, a first embodiment of the present invention is characterized in that it comprises a GPS sensor for receiving GPS satellite radio waves and outputting measurement position data, a box member capable of accommodating a PDA which is capable of providing navigation information based on the measurement position data by means of a display panel, and a system controller for repeating the measurement position data to the PDA accommodated in the box member to cause the PDA to perform a navigation operation, and that the box member includes a lid member openable and closeable for allowing the PDA to be inserted into and removed from the box member, a connector connected to input/output terminals of the PDA, and a window for allowing a display panel of the PDA accommodated in the box member to be observed therethrough.

Furthermore, the first embodiment of the present invention is characterized in that a switch for inputting a controlling instruction for the PDA is provided on the box member. Furthermore, the first embodiment of the present invention is characterized in that the PDA includes storage means for acquiring necessary map information from the outside and storing the map information, that the PDA and the system controller are connected to each other in the inside of the box member, that the box member is mounted for upward and downward pivotal motion at a substantially central portion of a handlebar and is formed for displacement between a use position in which the box member extends substantially in parallel to a face of an instrument panel of the motorcycle and a retracted position in which the box member extends along the vehicle body, and that the box member is capable of being latched and unlatched by a key of the vehicle.

According to the characteristics described above, navigation information can be displayed making use of a function of the PDA based on measurement position data detected by the GPS sensor. Furthermore, since the PDA can be accommodated in the box member and utilized, protection from dust and water can be anticipated. In addition, since the PDA is removably mounted on the motorcycle through the box, when it is not used for navigation, it can be removed from the motorcycle and carried to prevent burglary or to use the PDA for an application other than navigation.

According to a second embodiment of the present invention for achieving the object described above, a first characteristic of the second embodiment is characterized in that it comprises a GPS sensor for receiving GPS satellite radio waves and outputting measurement position data, an instrument panel for a vehicle provided on a front face of a vehicle body, and a display unit for causing navigation information to be displayed on a display panel based on the measurement position data, and that the display unit is supported on the vehicle body for pivotal motion between a first position set so that a display face of the display unit is substantially parallel to a face of the instrument panel and a second position wherein the display face is retracted at a predetermined angle with respect to the instrument panel.

Furthermore, the second embodiment of present invention has a second characteristic in that the display unit is disposed on the instrument panel, and that the display unit is supported on the vehicle body for posture variation between a first position wherein a display face of the display unit rises along the instrument panel and a second position wherein the display face is directed downwardly along an upper face of the instrument panel.

Furthermore, the second embodiment of the present invention has a third characteristic in that the display unit includes a box member capable of accommodating therein a PDA which is capable of providing navigation information based on the measurement position data by means of the display panel, and a system controller for repeating the measurement position data to a PDA accommodated in the box member to cause the PDA to perform navigation operation, and that the box member is supported on the vehicle body for posture variation between the first position and the second position.

According to the first and second characteristics described above, since the display unit for causing navigation information to be displayed extends, at the first position thereof, along the face of the instrument panel, a driver can recognize the navigation information in a similar sense to that when it looks at the instrument panel. Furthermore, since the display unit is pivoted, at the second position thereof, to the predetermined angle with respect to the instrument panel, the location around the instrument panel is simplified except when navigation information is to be acquired.

According to the third characteristic, essential part of the display unit for navigation information can be formed from a PDA. Furthermore, the box member for accommodating a PDA can be supported for posture variation between the first and second positions on the vehicle body. In particular, navigation information can be displayed using a function of the PDA based on measurement position data detected by the GPS sensor. Then, since the PDA can be used while it is accommodated in the box member, protection from dust and water can be anticipated. Furthermore, since the PDA can be removably mounted on the motorcycle through the box member, when it is not used for navigation, it can be removed from the motorcycle and carried to prevent burglary or for use in an application other than navigation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
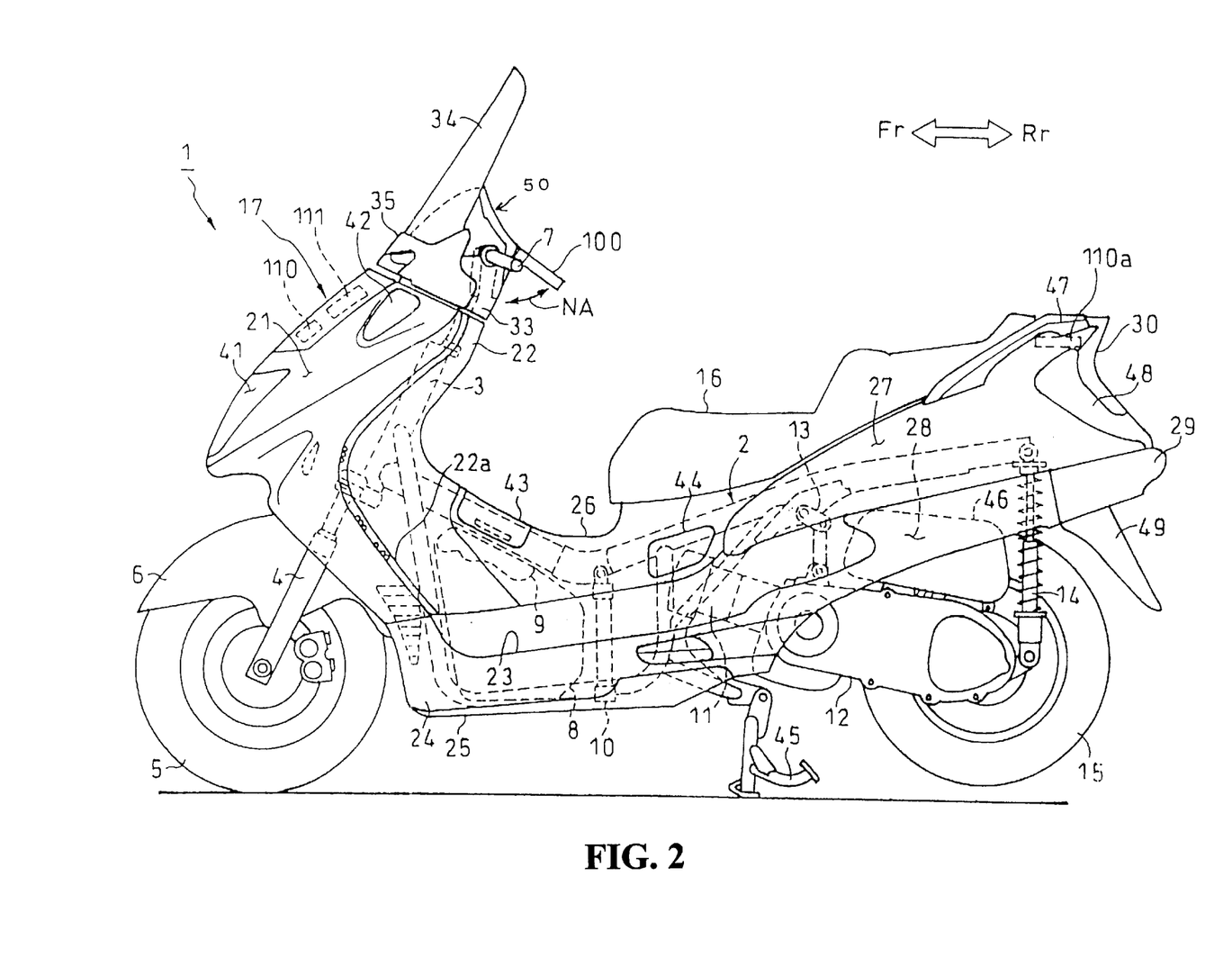
FIG. 2 is a side elevational view of the scooter to which the present invention can be applied.
Figure 3:
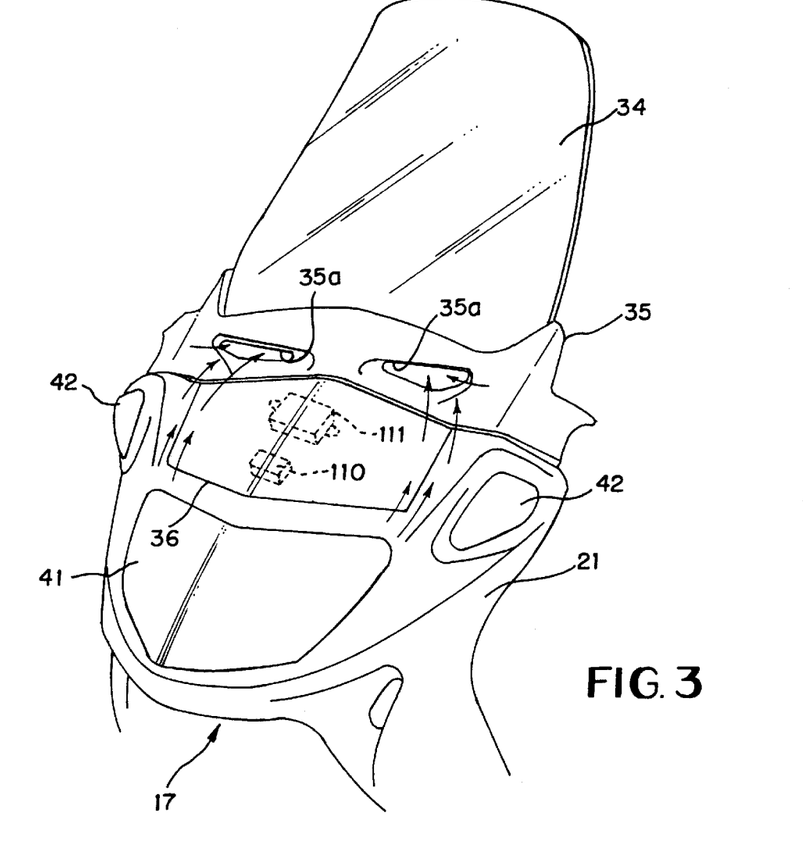
FIG. 3 is a perspective view of a front portion of the scooter to which the present invention is applied.

In the following, the present invention is described with reference to the accompanying drawings. FIG. 2 is a side elevational view of a motorcycle to which a navigation system of the present invention is properly applied, and FIG. 3 is a perspective view of essential part of the motorcycle. The motorcycle (hereinafter referred to as a "scooter") 1 of the scooter type has a body frame 2 of the double cradle type which extends in the forward and backward direction of a vehicle body. A head pipe 3 is mounted at a front end of the body frame 2, and a front wheel 5 is mounted at an end of a front fork 4 which extends downwardly from the head pipe 3. An upper portion of the front wheel 5 is covered with a front fender 6. A handlebar 7 is secured to an upper portion of the front fork 4, and front and rear portions of the handlebar 7 are covered with a handle cover 33 which is divided into two forward and backward portions.

A transparent window screen 34 is provided on the handle cover 33 by a stay not shown, and a screen garnish 35 as a cover member is provided at a lower portion of a front face of the window screen 34. A PDA accommodation box (hereinafter referred to merely as a "box") 100 which can accommodate therein a PDA (details of which are hereinafter described) used for the navigation system is provided on the handle cover 33. The box 100 is supported for rocking motion in directions indicated by an arrow mark NA.

A fuel tank 8, a radiator reservoir tank 9, and a radiator 10 are provided in a cradle space surrounded by pipes of the body frame 2, and a power unit 12 having a water-cooled engine 11 provided at a front portion thereof is provided rearwardly of the cradle space. The power unit 12 is mounted for rocking motion on the body frame 2 with a front portion thereof suspended by a link mechanism 13 and with a rear end portion thereof suspended by a rear cushion 14. A rear wheel 15 is mounted at a rear portion of the power unit 12, and the body frame 2 is covered with a body cover 17 and a seat 16 is disposed at a rear upper portion of the body frame 2.

A front portion of a body cover 17 is formed from a front cover 21 which covers a front portion of the head pipe 3 and an upper portion of the front wheel 5 and an inner cover 22 which covers a rear portion of the front cover 21. A pair of left and right step floors 23 on which feet of a driver are placed extend rearwardly from the inner cover 22, and a pair of floor skirts 24 extend downwardly from outer edges of the step floors 23. An under cover 25 covers between lower ends of the floor skirts 24, and a center cover 26 which extends rearwardly from the inner cover 22 covers a longitudinally central portion of the body frame 2. The opposite side faces of a rear portion of the body frame 2 are covered with side covers 27 extending rearwardly from the center cover 26. A pair of left and right lower side covers 28 extend downwardly from outer edges of the side covers 27, and a lower portion of the rear end of the body frame 2 is covered with a rear center cover 29 provided rearwardly of the lower side covers 28. An upper portion of the rear end of the body frame 2 is covered with a rear upper cover 30 provided above the rear center cover 29.

A headlamp 41 and blinker to turn signal lights 42 are mounted on the front cover 21. Furthermore, a GPS sensor 110 which receives GPS satellite radio waves for a navigation system and outputs measurement position data and an MPU 111 serving as a system controller for controlling the navigation system are disposed on the front cover 21. It is to be noted that the location of the GPS sensor 110 is not limited to the front portion of the vehicle body, but it may be mounted (reference character 110a) at such a position of a rear end portion of the vehicle body which is not hidden by a driver such as, for example, a rear upper cover 30. A pair of wind inlet ports 35a, 35a are provided in the screen garnish 35. Running wind flowing along the front face of the front cover 21 is introduced into the wind inlet ports 35a, 35a.

An oil supply lid 43 and an ignition plug-checking lid 44 are provided at part of the center cover 26. A main stand 45 is provided at a lower portion of the vehicle body, and an air cleaner 46 is provided in the inside of the lower side covers 28. Furthermore, a rear grip 47, a tail lamp 48, and a rear fender 49 are provided at rear portions of the vehicle body.

Figure 4:
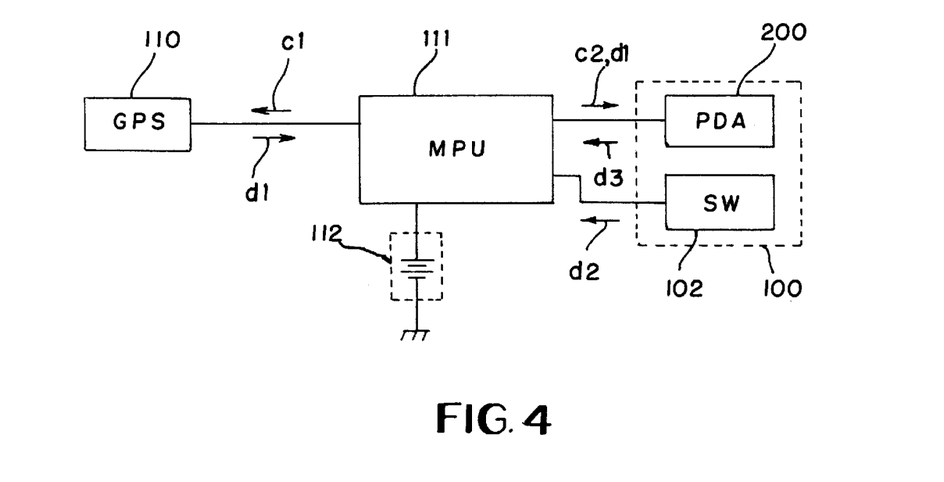
FIG. 4 is a system construction diagram of a navigation system.

FIG. 4 is a system block diagram of the navigation system. To the MPU 111 as a system controller for managing navigation operation in a concentrated manner, the GPS sensor 110 and a PDA 200 which is accommodated in the box 100 are connected. It is to be noted that a PDA is known as a portable information apparatus for personal use having a function of managing a schedule of a person and so forth, a display panel function for allowing inputting with a pen, a function of searching a large amount of information such as a dictionary, a manual and so forth built therein, and so forth. The present embodiment makes it possible to use those functions as navigation functions by storage and search of map information. Also a switch 102 for causing switching or scrolling of a display screen of the PDA 200 to be performed or contracting or expanding a map is provided on the box 100. The switch 102 is also connected to the MPU 111. Power supply to the MPU 111 is derived from a battery 112 carried on the vehicle. While the PDA 200 has a battery in the inside thereof, when it is connected to and used together with the MPU 111, it can receive supply of power from the battery 112 through the MPU 111.

The PDA 200 has a memory into which travel data can be stored and a display screen, and provides navigation information in accordance with measurement position data from the GPS sensor 110 and a control signal from the MPU 111 to perform navigation operations. The travel data includes electronic map information and route information to a destination. The travel data is produced, for example, based on information obtained from a network such as the Internet using a personal computer and electronic map information. A travel route is produced by providing a destination as input information, and a way point such as a main intersection on the route is selected in accordance with an algorithm set in advance if the route is determined. The travel data may be inputted from a personal computer or information stored in advance in a ROM or the like may be transferred as the travel data.

The CPU 111 supplies a control signal c1 to the GPS sensor 110, and the GPS sensor 110 receives GPS satellite radio waves in accordance with the control signal c1. The GPS sensor 110 inputs measurement position data d1 based on the GPS satellite radio waves to the MPU 111. The MPU 111 analyzes the measurement position data d1 and an instruction signal d2 from the switch 102 and supplies a control signal c2 and measurement position data d1 to the PDA 200. The PDA 200 is started up by the control signal c2, executes a predetermined program using the measurement position data d1 and displays navigation information on the display panel. The PDA 200 inputs a status signal d3 indicative of an operation status to the MPU 111.

Figure 1:
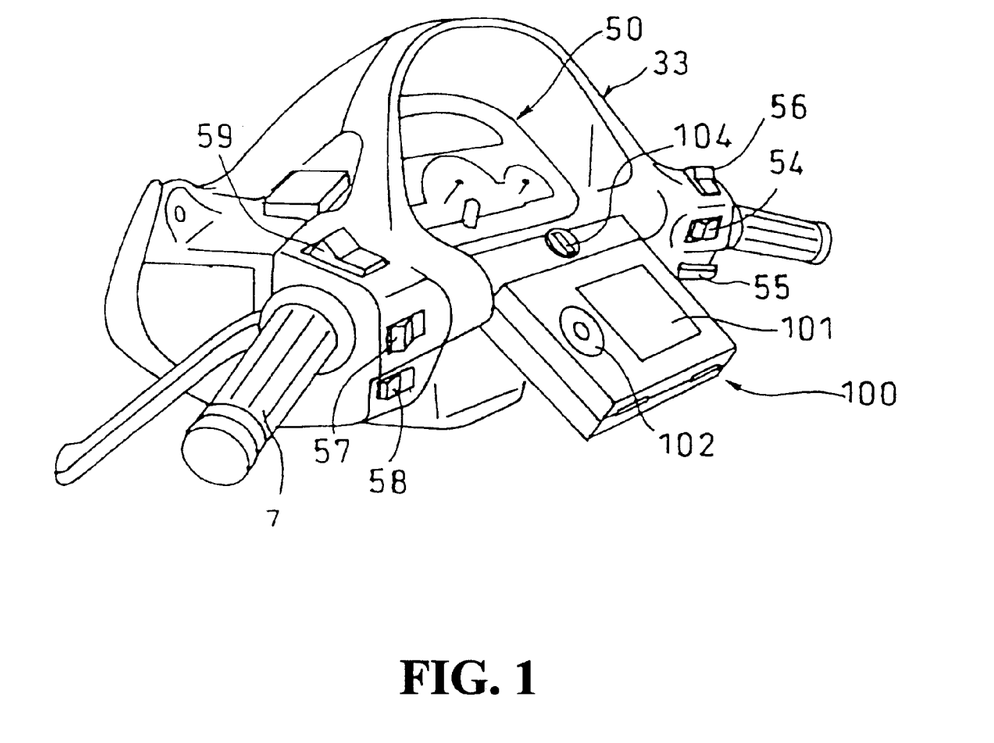
FIG. 1 is a perspective view showing a dashboard and associated members of a scooter according to an embodiment of the present invention.
Figure 5:
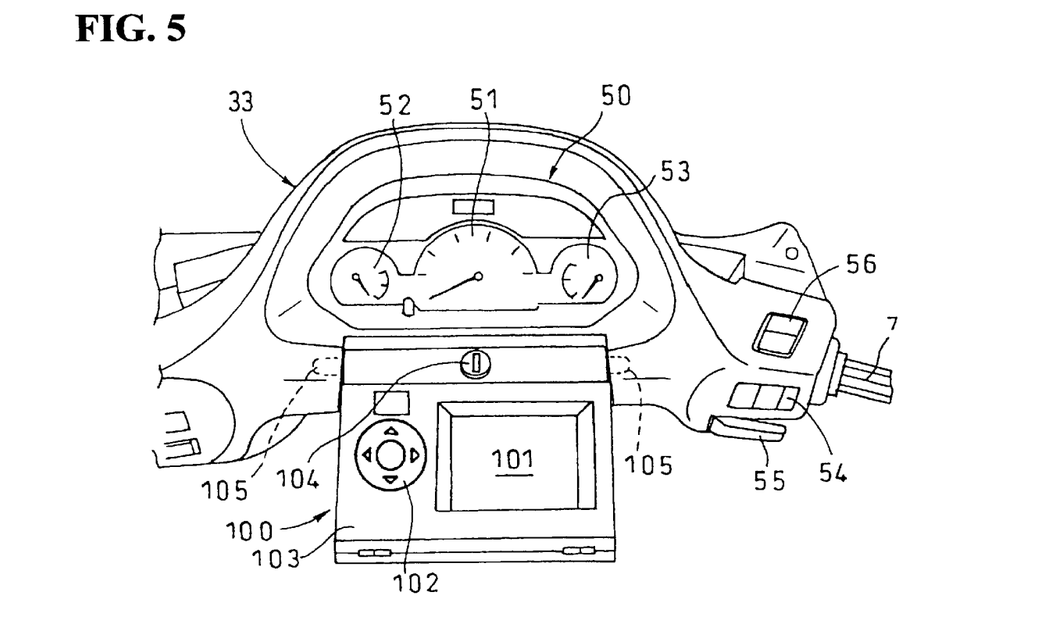
FIG. 5 is a perspective view of a front face showing an instrument panel and associated members of the scooter according to the embodiment of the present invention.
Figure 6:
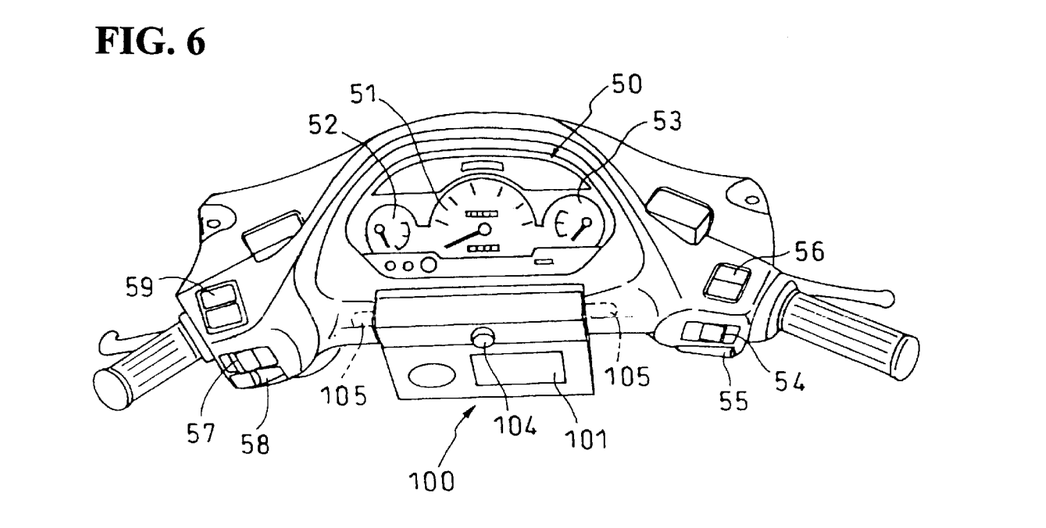
FIG. 6 is a perspective view of essential part showing the instrument panel and associated members of the scooter according to the embodiment of the present invention.

Subsequently, a mounted manner of the box 100 in which the PDA 200 described above is accommodated is described. FIG. 1 is a sideward perspective view of a front portion of the scooter on which the box 100 is mounted, FIG. 5 is a front perspective view of the scooter, and FIG. 6 is a front perspective view showing a manner wherein the PDA 200 is moved (pivoted) to a position for non-use. In the figures, like reference numerals to those of FIG. 2 denote like elements. It is to be noted that, in FIGS. 1, 5 and 6, a state wherein the window screen 34 is removed is illustrated. An instrument panel (meter) 50 is incorporated in the handle cover 33. A speedometer 51 is provided at the center of the face of the instrument panel 50, and a fuel gauge 52 is provided on the left side of the instrument panel 50 while a water temperature gauge 53 is provided on the right side of the instrument panel 50.

A hazard switch 54 is provided in an upper stage of the front face adjacent on the right side of the instrument panel 50 while a starter switch 55 is provided in a lower stage, and a kill switch 56 is provided on an upper face. Furthermore, a blinker or turn signal switch 57 is provided in an upper stage of the front face adjacent on the left side of the instrument panel 50 while a horn switch 58 is provided in a lower stage, and a high beam/low beam switch 59 is provided on an upper face.

The box 100 is mounted along a lower edge of the instrument panel 50. The box 100 is so dimensioned and shaped that a PDA having a memory in which map information to be used for the navigation system can be stored and a display panel can be accommodated. A window 101 in which a transparent glass plate, a transparent acrylic sheet or the like is provided so that the display panel of the PDA 200 accommodated in the box 100 may be observed therethrough and a switch 102 are provided on the box 100. For the switch 102, a switch which can be operated leftwardly, rightwardly, upwardly and downwardly as indicated by arrow marks in FIG. 5 is used, and a click to the left or the right is used for switching of the display panel of the PDA 200 whereas a click upward or downward is used for enlargement or contraction of a map or the like. A face 103 of the box 100 on which the window 101 and the switch 102 are provided is formed as a lid. Removal or insertion of a PDA is performed with the lid 103 opened. A knob 104 is provided on the lid 103 such that the lid 103 can be latched and unlatched by pivoting the knob 104. Preferably, the knob 104 can be operated to latch and unlatch by means of an engine key for the sake of security.

The box 100 has a pair of pivot shafts 105, 105 projecting leftwardly and rightwardly, and each of the pivot shafts 105, 105 is supported by a bearing (not shown) incorporated in the handle cover 33. When the navigation system is to be used, the box 100 is lifted up (popped up) by spring means not shown to a position (first position) in which the display face of the PDA is substantially in register with the face of the instrument panel 50 as shown in FIGS. 1, 2 and 5. On the other hand, when the navigation system is not used, the box 100 can be pushed down so as to be retracted to a position (second position) in which the display face of the PDA, that is, the window 101, lies substantially in a vertical plane. Preferably, rocking means such as a magnetic catch is provided on the rear face of the box 100 and the handle cover 33 so that the box 100 may be fixed to the handle cover 33 in the retracted position.

Preferably, each of the pivot shafts 105, 105 has a rotational damper provided therefor which acts against the spring means described above when the box 100 is pivoted from the retracted position (position of FIG. 6) to the use position (position of FIG. 1). This is because it is convenient for smooth pivotal motion of the box 100 and for protection of the PDA from vibrations of the vehicle and prevention of vibrations of the display screen. An oil damper wherein oil is enclosed in a package can be used for the rotational dampers. This damping action functions only when the box is pivoted to the first position, but the damping action does not function upon pivotal motion from the first position to the second position. Accordingly, when the GPS display screen, that is, the display panel of the PDA, is to be observed, the screen can be pivoted moderately from the retracted position (second position), but when the screen is to be retracted, it can be retracted rapidly.

Figure 7:
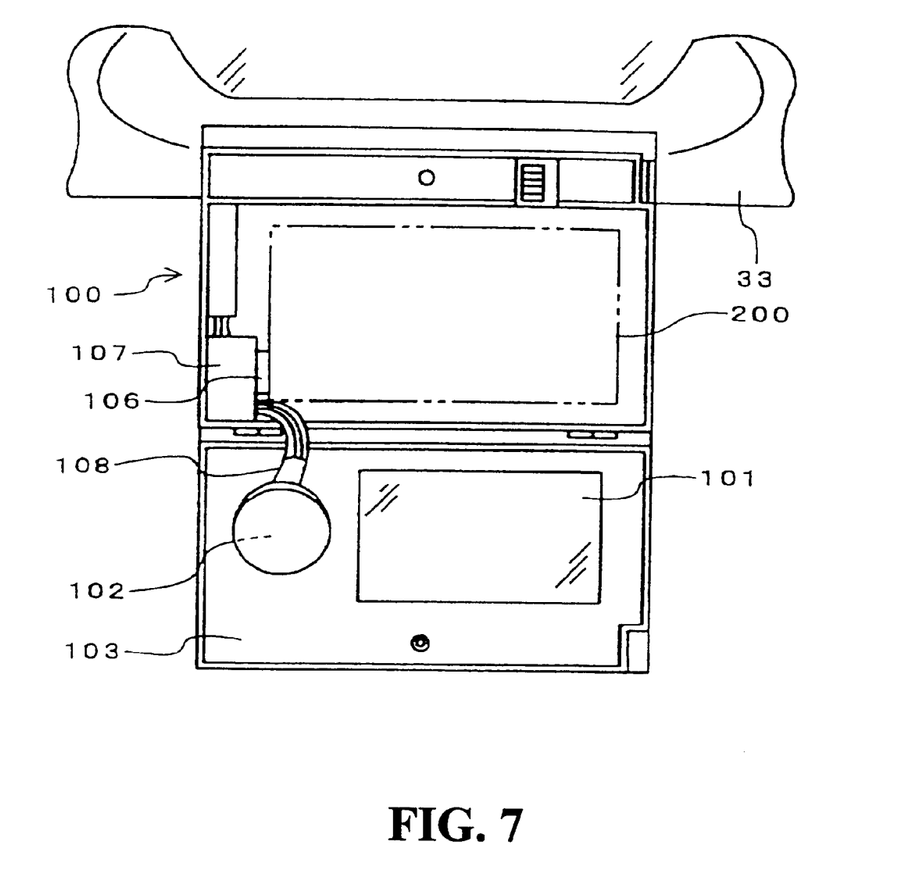
FIG. 7 is a perspective view of a PDA accommodation box illustrating a state wherein a cover is open.

FIG. 7 is a perspective view of the box 100 illustrating a state wherein the lid 103 is open. A repeating section 107 having a connector 106 of multiple poles for coupling to input/output terminals of the PDA 200 is provided in the box 100. The repeating section 107 repeats a signal from the connector 106 to the MPU 111, and repeats a signal of the switch 102 to the MPU 111 over a cable 108. The PDA 200 can be removably mounted into the box 100 through the connector 106.

Accordingly, upon starting of the scooter, the PDA 200 can be connected to the connector 106 and incorporated as a navigation system. Furthermore, when the driver intends to leave the scooter, The PDA 200 can be disconnected from the connector 106 and drawn out from the box 100 and then carried independently of the navigation system. Since the PDA 200 is accommodated in the box 100 in this manner, the PDA 200 can be removed readily from the scooter. Consequently, this is convenient from the point of view of prevention of burglary and this is convenient also where the PDA 200 is used as a multi-function information apparatus such that it is used as an address book or a dictionary without using it for navigation. Furthermore, since a connection section to a PDA is accommodated in the box 100, the influences of rain, wind, dust and so forth can also be avoided.

Figure 8:
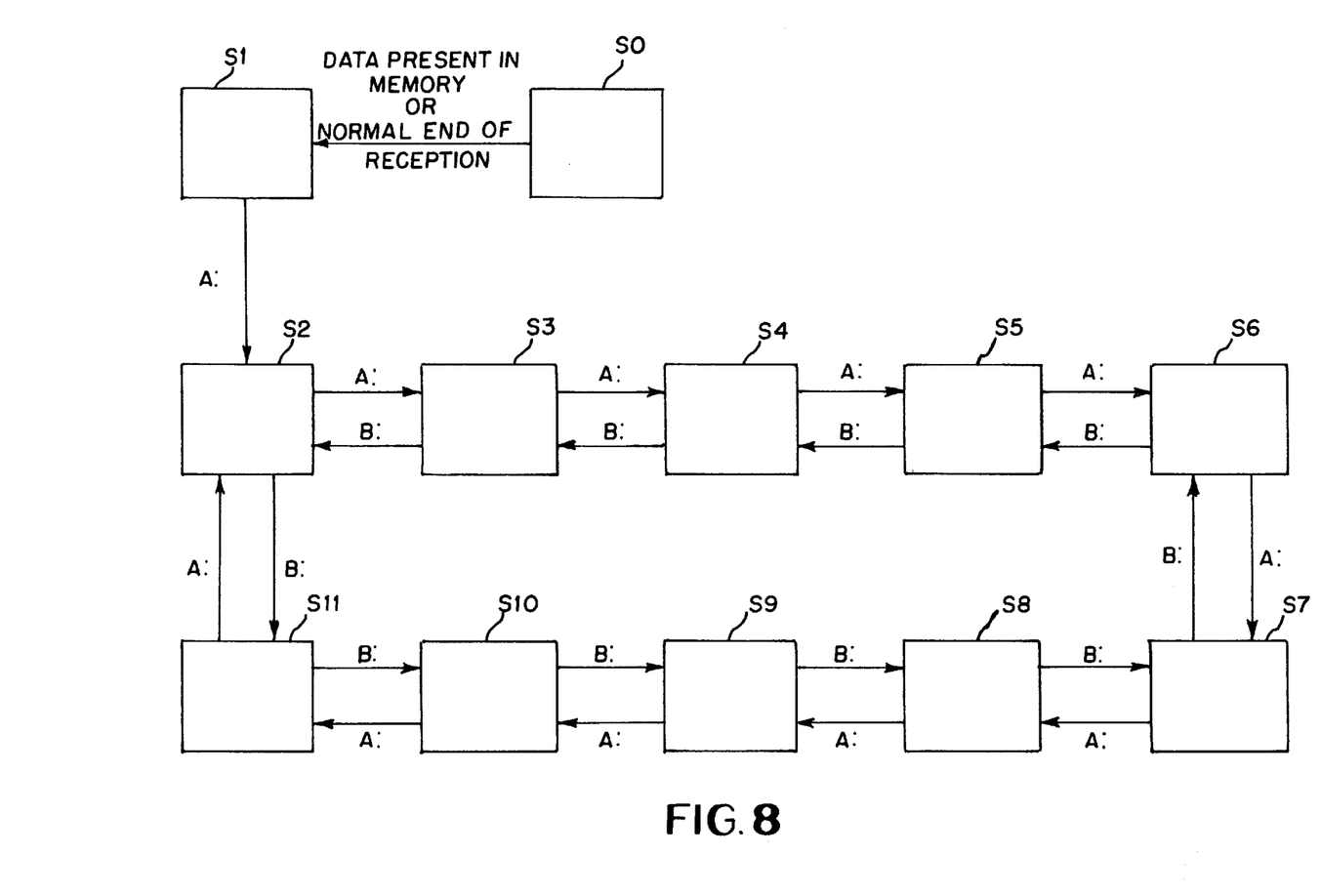
FIG. 8 is a status transition diagram in the navigation system.
Figure 9:
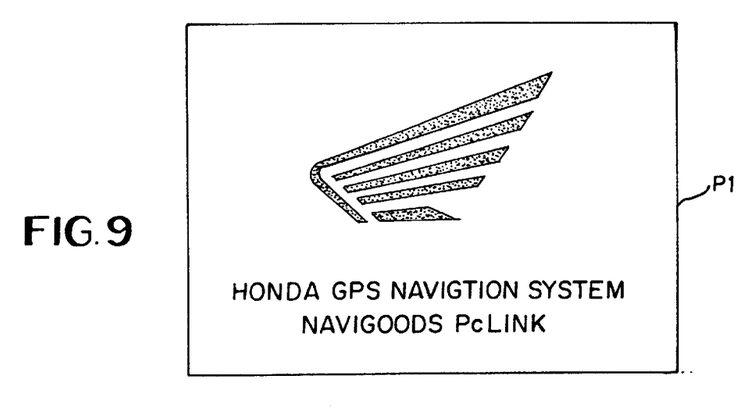
FIG. 9 is a view showing a display example (1) of a PDA display panel.
Figure 10:
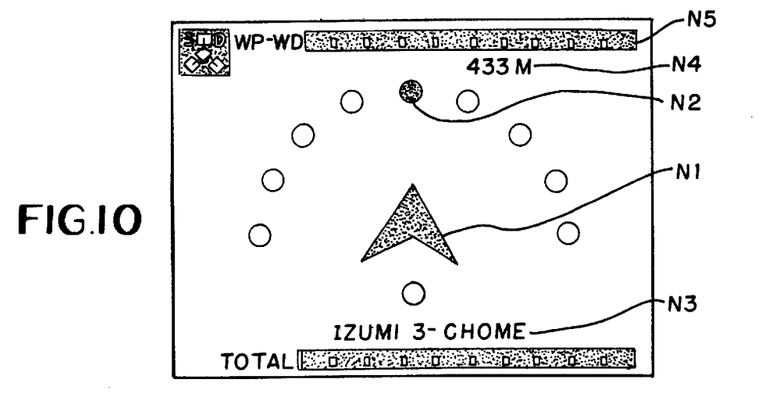
FIG. 10 is a view showing a display example (2) of the PDA display panel.
Figure 11:
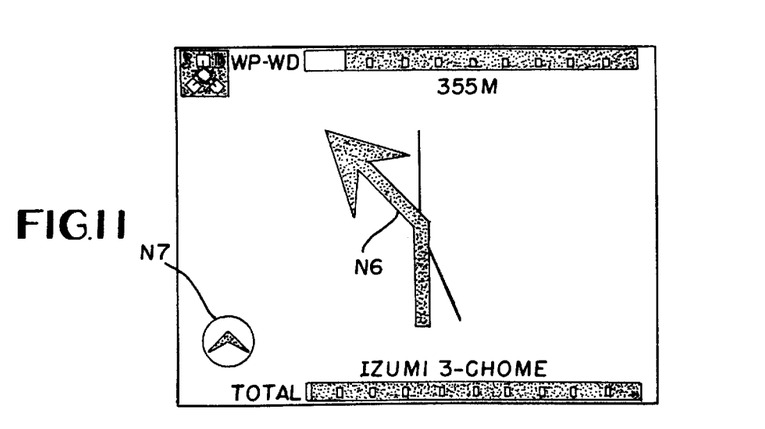
FIG. 11 is a view showing a display example (3) of the PDA display panel.

A status transition of the navigation system is described with reference to a status transition diagram of FIG. 8 and an example of the display screen (FIGS. 9 to 14). In FIG. 8, letter A indicates a left click, while Letter B indicates a right click of the switch 102. Referring to FIG. 8, in status S0, the navigation system is waiting for reception of data. When data is in the memory of the PDA 200 or when reception of data comes to an end normally, the status advances to status S1. In status S1, the navigation system further waits for reception of data and waits a starting instruction. In statuses S0 and S1, a title screen P1 of FIG. 9 is displayed on the display panel.

If the switch 102 is clicked to the left in status S1, then the status advances to status S2. In status S2, an arrow mark navigation display screen is displayed (refer to FIG. 10). On the arrow mark navigation display screen, an arrow mark N1 indicative of a direction to a way point and a dot mark N2, a name N3 of the way point, a distance N4 indicative of a great circle distance to the way point and a graphic image N5 which indicates a decrease of the distance N4 to the way point in the form of a bar graph are displayed.

If the switch 102 is clicked to the left in status S2, then the status advances to status S3. In status S3, a frame map navigation screen is displayed (refer to FIG. 11). On the frame map navigation screen, an arrow mark N6 of a shape of a way point and an advancing direction is displayed in a large size, and the direction to the way point is indicated by a small arrow mark N7. If the switch 102 is clicked to the left in status S3, then the status advances to status S4, but if the switch 102 is clicked to the right, then the status returns to status S2. In status S4, a map navigation screen is displayed. In this status S4, the map is fixed.

Figure 12:
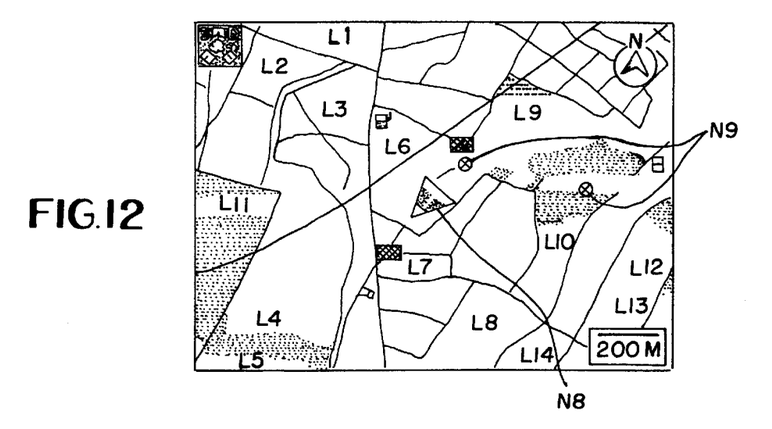
FIG. 12 is a view showing a display example (4) of the PDA display panel.

If the switch 102 is clicked to the left in status S4, then the status advances to status S5, but if the switch 102 is clicked to the right, then the status returns to status S3. In status S5, a map navigation screen with a travel locus is displayed in addition to the display in status S4 (refer to FIG. 12). An arrow mark N8 in the figure indicates the position of the self-motorcycle and the travelling direction, and the locus is indicated by a dot N9. In FIG. 12, a plurality of locations are identified, wherein L1 is a restaraunt; L2 is Musashino-line; L3 is Center Mihara; L4 is a convenience store; L5 is Mihara 1; L6 is a gas station; L7 is Fifth elementary school; L8 is Mihara 5; L8 is Hello work; L9 is Honda Giken Asaka; L10 is Toppan Printing; L11 is Izumi 3; L12 is Mizonuma; L13 is Mizo; L14 is Nissan Prince; LI5 is Izumi filtration plant; L15 is Izumi 2; and L16 is Ohki Shindo Kogyo.

If the switch 102 is clicked to the left in status S5, then the status advances to status S6, but if the switch 102 is clicked to the right, then the status returns to status S4. In status S6, a map navigation screen on which only the travelling locus is shown except a map is displayed.

If the switch 102 is clicked to the left in status S6, then the status advances to status S7, but if the switch 102 is clicked to the right, then the status returns to status S5. In status S7, a map navigation screen is displayed in a state wherein the position of the self-motorcycle is fixed. Accordingly, a screen on which the map is scrolled as the self-motorcycle travels is displayed.

If the switch 102 is clicked in status S7, then the status advances to status S8, but if the switch 102 is clicked to the right, then the status returns to status S6. In status S8, a map navigation screen with a travel locus is shown in a state wherein the position of the self-motorcycle is fixed is displayed.

If the switch 102 is clicked to the left in status S8, then the status advances to status S9, but if the switch 102 is clicked to the right, then the status returns to status S7. In status S9, a map navigation screen only with a travel locus shown except a map in a state wherein the position of the self-motorcycle is fixed is displayed.

Figure 13:
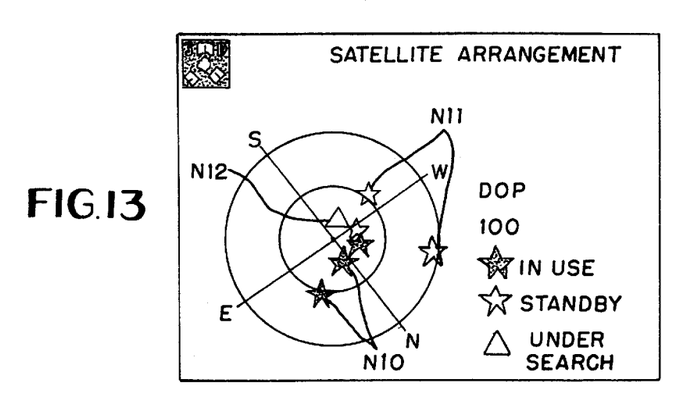
FIG. 13 is a view showing a display example (5) of the PDA display panel.
Figure 14:
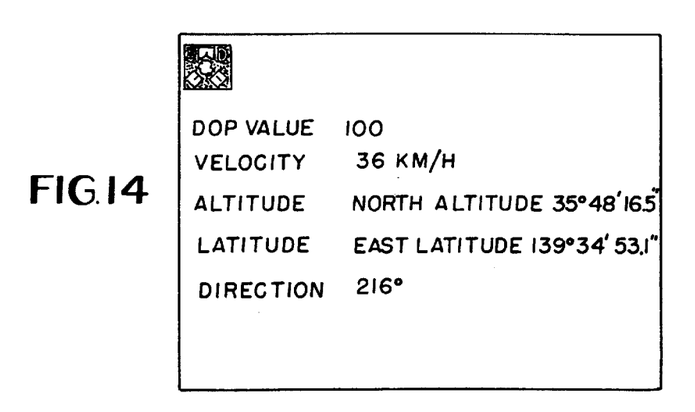
FIG. 14 is a view showing a display example (6) of the PDA display panel.

If the switch 102 is clicked to the left in status S9, then the status advances to status S10, but if the switch 102 is clicked to the right, then the status returns to status S8. In status S10, arrangement of satellites is displayed (refer to FIG. 13). In FIG. 13, satellites N10 being used, satellites N11 in a standby state and satellites N12 under search are displayed together with the direction.

If the switch 102 is clicked to the left in status S10, then the status advances to status S11, but if the switch 102 is clicked to the right, then the status returns to status S9. In status S11, an altitude and a latitude indicative of the position of the self-motorcycle are displayed (refer to FIG. 14). On this display screen, a travelling speed, an altitude, a latitude and an advancing direction are indicated on the display screen.

If the switch 102 is clicked to the left in status S11, then the status returns to status S2, and if the switch 102 is clicked to the right in status S2, then the status skips statuses S3 to S10 and advances to status S11.

While the status transition diagram described above illustrates an example of transition which proceeds in response to an operation of the switch 102, it is possible to perform switching between the arrow mark navigation display and the frame map navigation display in response to the position of the self-motorcycle to a way point without an operation of the switch 102. For example, the arrow mark navigation display is displayed up to a point 400 m short of a way point, and then when the point 400 m short of the way point is reached, the display is switched from the arrow mark navigation display to frame map navigation display. Furthermore, when the self-motorcycle is spaced by 50 m from the way point after it passes the way point, or when the self-motorcycle does not advance straightforwardly across an intersection and is directed to an intersection leaving direction, the way point of the object is switched and switching from the frame map navigation display to the arrow mark navigation display is performed. Furthermore, the way point is automatically updated when the self motorcycle goes out of the preset travel route.

Figure 15:
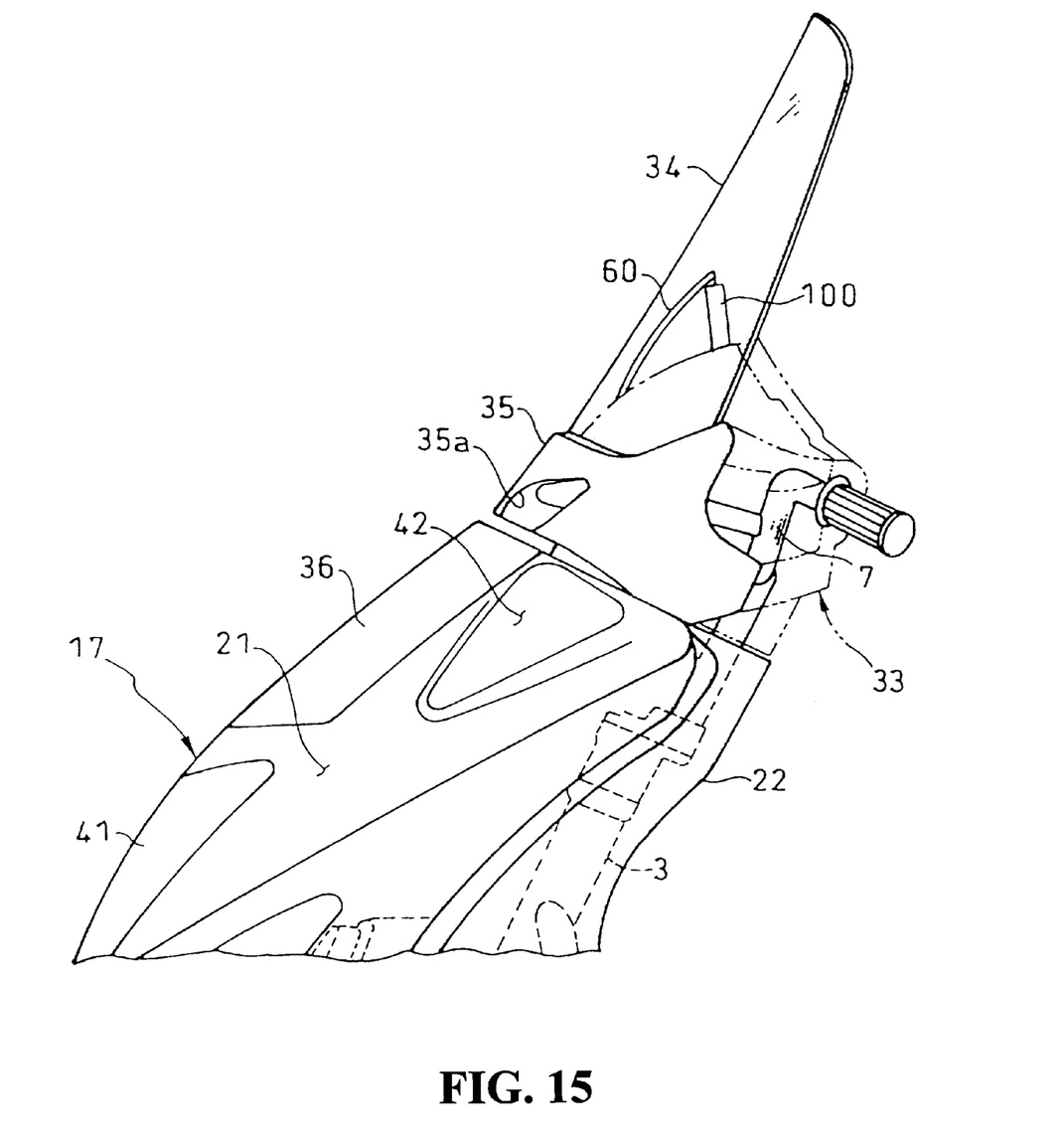
FIG. 15 is a side elevational view of a front portion of the scooter showing the box provided above the instrument panel.
Figure 16:
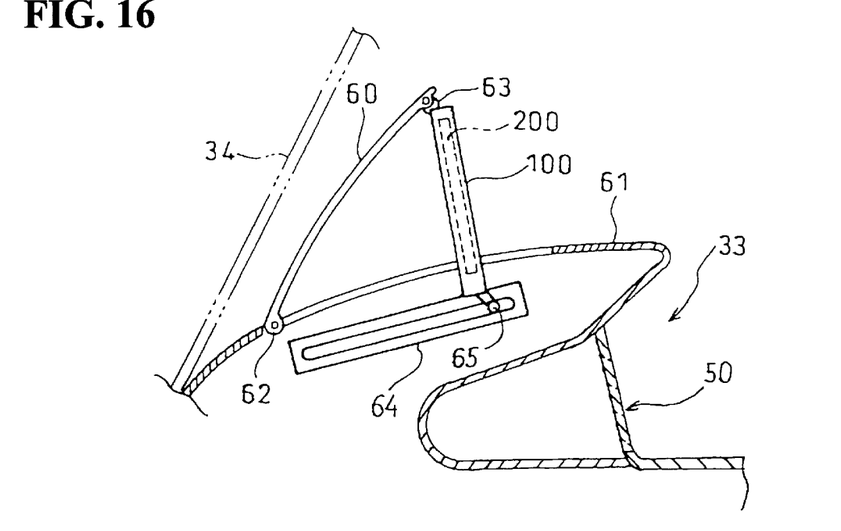
FIG. 16 is an enlarged sectional view of essential part of FIG. 15.

Subsequently, modifications are described. While, in the embodiment described above, the box 100 in which a PDA 200 is accommodated is mounted along the lower edge of the instrument panel 50, the position at which the box 100 is to be mounted is not limited to this position, and it can be mounted above the instrument panel 50. FIG. 15 is a side elevational view of a front portion of a scooter showing the box 100 provided above the instrument panel 50, and FIG. 16 is an enlarged sectional view of essential part of FIG. 15. Furthermore, FIG. 17 is a sectional view when the box 100 is accommodated.

An upper plate 60 forms part of a cover 61 which covers an upper portion of the instrument panel 50, and is supported for pivotal motion on the cover 61 by a hinge 62. To an end portion of the upper plate 60, that is, to an end portion of the upper plate 60 opposite to the side supported by the hinge 62, an upper edge of the box 100 for accommodating a PDA 200 therein is connected by a hinge 63. Furthermore, on the opposite ends of a lower end of the box 100, a pair of sliders 65 which fit with and slidably move on a pair of two (only one is shown) rails 64 provided separately on the left and right of the vehicle body are provided.

Figure 17:
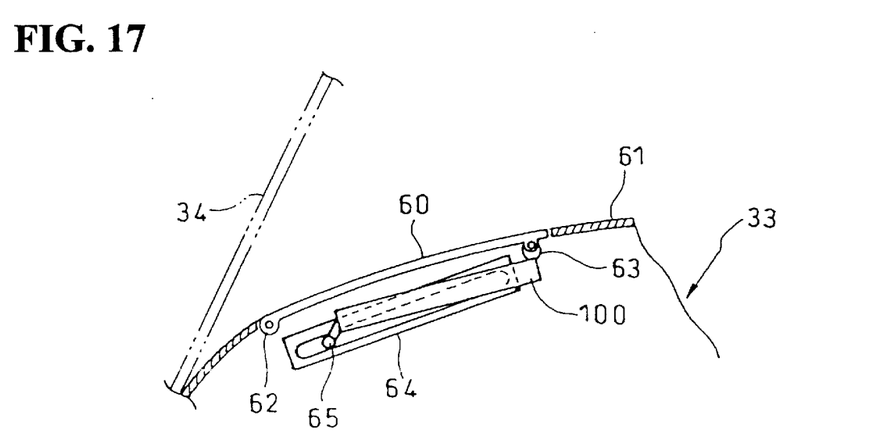
FIG. 17 is a sectional view of essential part of the scooter when a box is accommodated.

By the construction described above, if the upper plate 60 is lifted from a state wherein the box 100 is folded as shown in FIG. 17, then since the box 100 is coupled to an end portion of the upper plate 60 by the hinge 63, it is lifted by the upper plate 60. Meanwhile, the lower edge of the box 100 slidably moves on the rails 64 by means of the sliders 65 and is guided to an end position of the rails 64 (a rather rear position of the vehicle body). Consequently, as shown in FIGS. 15 and 16, the box 100 is lifted with the display panel face of the PDA 200 directed toward the driver until the display face of the instrument panel 50 and the display panel face of the PDA become substantially parallel to each other, thereby entering a state wherein the individual displays can be observed readily. Furthermore, if a portion of the box 100 in the proximity of the lower edge is pushed with a finger to depress the upper plate 60 from the state of FIGS. 15 and 16, then the box 100 is accommodated into the cover 61 in a state wherein the display panel face of the PDA 200 is directed downwardly as shown in FIG. 17.

Figure 18:
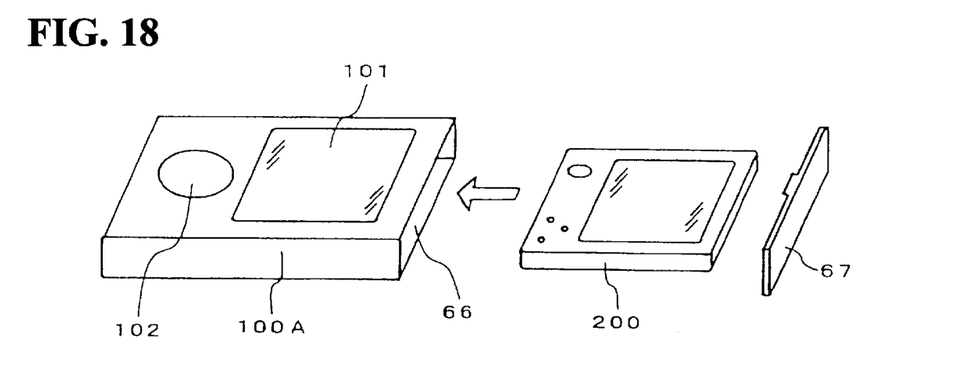
FIG. 18 is an exploded perspective view according to a modification to the box for accommodating a PDA.

While, in the embodiment described above, the lid 103 supported by a hinge is opened and the PDA 200 is inserted or removed, the structure of the box 100 is not limited to this. FIG. 18 is a perspective view of a modification to the box 100. An opening 66 through which a PDA 200 is to be removed or inserted is provided at an end portion of a box 100A, and a lid 67 fits in the opening 66. On the box 100A, a window 101 through which the display panel of a PDA accommodated in the box 100A can be observed and a switch 102 as well as a connector for connection of terminals of a PDA 200 and so forth (not shown) are provided similarly as in the embodiment of FIG. 7.

Where a PDA 200 is incorporated in and used together with a navigation system, the lid 67 is opened and the PDA 200 is inserted into the box 100A through the opening 66, and then the lid 67 is fitted into the opening 66 to close up the box 100A. On the other hand, when the PDA 200 incorporated in the navigation system is not used, the lid 67 is removed to open the opening 66, and the PDA 200 is removed from the box 100A.

It is to be noted that preferably a packing or a seal for waterproofing or dust proofing is interposed between fitting faces of the lid 103 and the lid 67 for the boxes 100 and 100A and the boxes 100 and 100A described hereinabove with reference to FIGS. 7, 18 and so forth.

As is apparent from the foregoing description, according to the first embodiment of the present invention, the PDA serving as data storage and display means capable of providing navigation information can be removably mounted readily on the motorcycle, and only necessary map information can be acquired and stored into the PDA from the outside. Furthermore, by accommodating the PDA into the box member, waterproofing and dust proofing are facilitated. This is preferable when the navigation system is utilized on a motorcycle. Furthermore, according to the first embodiment of the present invention, when the navigation system is not in use, it is possible to keep it accommodated in the box member. Furthermore, since latching is possible, the navigation system of the present invention is advantageous for a motorcycle which is small in size and which has a vehicle body exposed to the outside elements.

As is apparent from the foregoing description, according to the second embodiment of the present invention, when the navigation system is to be used, the display face of the display unit is brought into register with the face of the instrument panel (meter) so that navigation information displayed on the display unit can be readily visually observed. On the other hand, when the navigation system is not used, the display face of the display unit is retracted to the predetermined angle with respect to the face of the instrument panel, and consequently, the location around the face of the instrument panel is simplified.

According to the second embodiment of the present invention, the display face can be pivoted moderately by the damper action, and retraction can be performed rapidly. Furthermore, since the display unit is removably mounted, the navigation system can be utilized as a portable navigation apparatus. However, when the navigation apparatus is not used, the box member can be utilized as a glove compartment.

Furthermore, where navigation is displayed on a motorcycle, the limited space around the handlebar can be utilized effectively, and confirmation of displays of a meter and navigation of the vehicle is facilitated. In addition, when the navigation is not used, the box member is pivoted until it is brought into register with the vehicle body, and consequently, the navigation display face can be stored by a simple movement so that it does not form an obstacle. Furthermore, since a PDA which serves as map information storage display means can be accommodated into the box member, the PDA can be protected effectively from water or dust.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle with a navigation system carried thereon comprising:
   a GPS sensor for receiving GPS satellite radio waves and outputting measurement position data;
   a PDA for storing map information and displaying navigation information based on the measurement position data on a display panel;
   a box member capable of accommodating said PDA therein, said box member including:
      a lid member openable and closeable for allowing said PDA to be inserted into and removed from said box member;
      a connector connected to input/output terminals of said PDA; and
      a window for allowing a display panel of said PDA accommodated in said box member to be observed therethrough; and
   a system controller for causing said PDA accommodated in said box member to perform a navigation operation based on the measurement position data.

2. The vehicle with a navigation system carried thereon according to claim 1, wherein a switch for inputting a controlling instruction for said PDA is provided on said box member.

3. The vehicle with a navigation system carried thereon according to claim 2, further comprising a steering handlebar, and said box member is mounted for upward and downward pivotal motion at a substantially central portion of said handlebar and is formed for displacement between a use position in which said box member extends substantially in parallel to a face of an instrument panel of said vehicle and a retracted position in which said box member extends along a vehicle body thereof.

4. The vehicle with a navigation system carried thereon according to claim 2, wherein said box member is capable of being latched and unlatched by a key of said vehicle.

5. The vehicle with a navigation system carried thereon according to claim 1, wherein said PDA includes storage means for acquiring necessary map information from the outside and storing the map information.

6. The vehicle with a navigation system carried thereon according to claim 1, wherein said PDA and said system controller are connected to each other in the inside of said box member.

7. A vehicle with a navigation system carried thereon, comprising:
   a GPS sensor for receiving GPS satellite radio waves and outputting measurement position data;
   an instrument panel provided on a front face of a vehicle body; and
   a display unit for causing navigation information to be displayed on a display panel based on the measurement position data, said display unit being supported on said vehicle body for pivotal motion between a first position set so that a display face of said display unit is substantially parallel to a face of said instrument panel and a second position wherein said display face is retracted at a predetermined angle with respect to said instrument panel.

8. The vehicle with a navigation system carried thereon according to claim 7, further comprising:
   a pivot shaft for supporting said display unit for pivotal motion on said vehicle body;
   spring means for pivotally biasing said display unit from the second position to the first position; and
   rotational damper means for exerting a force against said spring means.

9. The vehicle with a navigation system carried thereon according to claim 8, wherein said display unit includes a box member capable of accommodating therein a PDA which is capable of providing navigation information based on the measurement position data by means of said display panel, and a system controller for repeating the measurement position data to a PDA accommodated in said box member to cause the PDA to perform navigation operation; said box member is supported on said vehicle body for posture variation between the first position and the second position.

10. The vehicle with a navigation system carried thereon according to claim 7, wherein said display unit includes a box member capable of accommodating therein a PDA which is capable of providing navigation information based on the measurement position data by means of said display panel, and a system controller for repeating the measurement position data to a PDA accommodated in said box member to cause the PDA to perform navigation operation; said box member is supported on said vehicle body for posture variation between the first position and the second position.

11. The vehicle with a navigation system carried thereon according to claim 10, wherein said box member includes an openable and closeable lid member for allowing insertion and removal of said PDA, a connector for connection to input/output terminals of said PDA, and a window for allowing a display panel of said PDA accommodated in said box member to be visually observed therethrough.

12. The vehicle with a navigation system carried thereon according to claim 7, wherein said rotational damper means acts only in a pivoting direction from the second position to the first position.

13. The vehicle with a navigation system carried thereon according to claim 7, wherein said display unit is provided substantially at a central location of a handle bar of said motorcycle and displays, at the first position thereof, a display face in the proximity of said instrument panel.

14. The vehicle with a navigation system carried thereon according to claim 7, wherein the second position of said display unit is set such that said display unit extends along a face of said vehicle body.

15. A vehicle with a navigation system carried thereon comprising:
   a GPS sensor for receiving GPS satellite radio waves and outputting measurement position data; an instrument panel provided on a front face of a vehicle body; and
   a display unit for causing navigation information to be displayed on a display panel based on the measurement position data, said display unit being disposed on said instrument panel and supported on said vehicle body for posture variation between a first position wherein a display face of said display unit rises along said instrument panel and a second position wherein said display face is directed downwardly along an upper face of said instrument panel.

16. The vehicle with a navigation system carried thereon according to claim 15, wherein said display unit includes a box member capable of accommodating therein a PDA which is capable of providing navigation information based on the measurement position data by means of said display panel, and a system controller for repeating the measurement position data to a PDA accommodated in said box member to cause the PDA to perform navigation operation; said box member is supported on said vehicle body for posture variation between the first position and the second position.

17. The vehicle with a navigation system carried thereon according to claim 15, wherein said display unit is provided substantially at a central location of a handle bar of said motorcycle and displays, at the first position thereof, a display face in the proximity of said instrument panel.

18. The vehicle with a navigation system carried thereon according to claim 15, wherein the second position of said display unit is set such that said display unit extends along a face of said vehicle body.

* * * * *